(12) United States Patent
Grimme et al.

(10) Patent No.: US 9,357,388 B2
(45) Date of Patent: May 31, 2016

(54) SYMBOL SELECTION FOR SWIPE BASED AUTHENTICATION

(71) Applicant: Lenovo (Singapore) Pte. Ltd., Singapore (SG)

(72) Inventors: Jason Grimme, Cary, NC (US); Kyle Jared McDaniel, Morrisville, NC (US); Russell Speight VanBlon, Raleigh, NC (US); Manisha Bijjaragi, Mebane, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 63 days.

(21) Appl. No.: 14/287,966

(22) Filed: May 27, 2014

(65) Prior Publication Data

US 2015/0350898 A1 Dec. 3, 2015

(51) Int. Cl.
*H04W 12/06* (2009.01)
*G06F 21/36* (2013.01)

(52) U.S. Cl.
CPC .............. *H04W 12/06* (2013.01); *G06F 21/36* (2013.01)

(58) Field of Classification Search
CPC ...... H04W 12/06; H04W 12/08; G06F 3/048; G06F 3/0488; G06F 21/31; G06F 21/36; G06F 2221/2113
USPC .................................... 455/410–411
See application file for complete search history.

(56) References Cited

U.S. PATENT DOCUMENTS

| 2006/0037067 | A1* | 2/2006 | Morris | G06Q 20/10 726/7 |
| 2012/0252410 | A1* | 10/2012 | Williams | 455/411 |
| 2013/0057496 | A1* | 3/2013 | Hong et al. | 345/173 |
| 2013/0333020 | A1* | 12/2013 | Deshpande | 726/16 |
| 2014/0143856 | A1* | 5/2014 | Wu | G06F 21/31 726/16 |

* cited by examiner

*Primary Examiner* — Michael Mapa
(74) *Attorney, Agent, or Firm* — Schwegman, Lundberg & Woessner, P.A.

(57) ABSTRACT

A method includes receiving swipe pattern sensed information from a touchscreen device representative of a user attempting to swipe an authentication pattern to authenticate the user, displaying a set of multiple different symbols including a user known symbol when the swipe reaches a known point in the authentication pattern, receiving a selection of the user known symbol, and authenticating the user based on proper selection of the user known symbol and completion of the authentication pattern.

20 Claims, 4 Drawing Sheets

SYMBOL SELECTION FOR SWIPE BASED AUTHENTICATION

BACKGROUND

Devices with credential swipe pattern authentication utilizing touch screens are vulnerable to revealing the swipe pattern by leaving a smear mark on the screen from a user's finger. It is also relatively simple for an onlooker to observe the user performing the swipe and memorizing the pattern.

SUMMARY

A method includes receiving swipe pattern sensed information from a touchscreen device representative of a user attempting to swipe an authentication pattern to authenticate the user, displaying a set of multiple different symbols including a user known symbol when the swipe reaches a known point in the authentication pattern, receiving a selection of the user known symbol, and authenticating the user based on proper selection of the user known symbol and completion of the authentication pattern.

A machine readable storage device has instructions for execution by a processor of the machine to perform receiving swipe pattern sensed information from a touchscreen device representative of a user attempting to swipe an authentication pattern to authenticate the user, displaying a set of multiple different symbols including a user known symbol when the swipe reaches a known point in the authentication pattern, receiving a selection of the user known symbol, and authenticating the user based on proper selection of the user known symbol and completion of the authentication pattern.

A device includes a processor and a memory device having a program stored thereon for execution by the processor to receive swipe pattern sensed information from a touchscreen device representative of a user attempting to swipe an authentication pattern to authenticate the user, display a set of multiple different symbols including a user known symbol when the swipe reaches a known point in the authentication pattern, receive a selection of the user known symbol, and authenticate the user based on proper selection of the user known symbol and completion of the authentication pattern.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

An authentication swipe pattern on a touchscreen device may have a symbol to select at a point along the pattern associated with the symbol. A set of symbols may be presented to the user when the user pauses at the point associated with the symbol or simply reaches or approaches the point. When the user selects the correct symbol and completes the pattern, the user will be authenticated and able to use the device. During set up of the swipe pattern by the user or administrator, the user may pick a point on the swipe pattern to associate with a selected symbol. This may be done by dragging a symbol to the point on the swipe pattern from a displayed set of symbols. In some embodiments, multiple points may have the same or different symbols to select by pausing at such points and selecting the correct symbol from the then displayed set of symbols.

Figure 1:
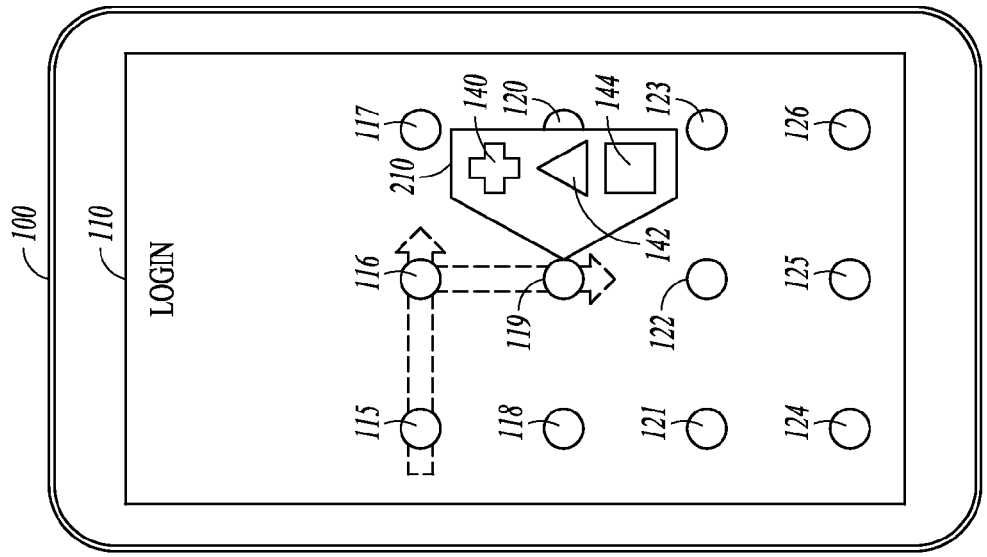
FIG. 1 is a representation of setup of an authentication pattern on touchscreen display of a device according to an example embodiment.

FIG. 1 is a block diagram of a device 100, such as a cellular phone, touchpad, laptop, or other computing device having a touchscreen for viewing information and entering information by touching a screen 110 of the device 100. Screen 110 is showing a user interface for creating an authentication or login gesture to be used by a user to gain access to the device 100. The device 100 generates a matrix of nodes 115, 116, 117, 118, 119, 120, 121, 122, 123, 124, 125, and 126 in one embodiment. A path 130, corresponding to an example swipe performed by the user has been created as shown. In this example, path 130 begins at node 115, proceeds to node 116, then 119, 122, 125, and ends on node 124. A set of symbols is displayed at 135, including a cross 140, triangle 142, and square 144. The shapes shown are just one example of some shapes that may be used. Many other shapes of varying color, shape, and character may be used. The user in this example has selected the triangle 142 and dragged and dropped it onto a point on the path. The point in this example corresponds to node 119.

In further embodiments, nodes need not be shown, and the user may simply create the path 130 by tracing a path with a finger or pointing device on the screen 110. During the setup, the path trace may be visible, allowing the user to select a symbol and drag it to any place on the path desired. Dragging to a corner of the path, such as at node 116 may be easiest for a user to remember. Multiple different symbols may be dragged to different points on the path in some embodiments.

Figure 2:
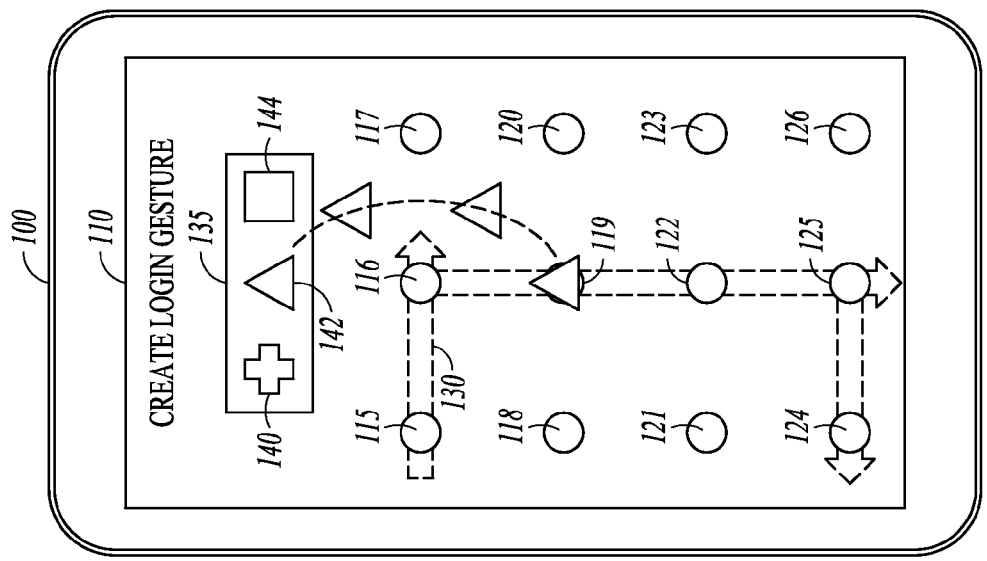
FIG. 2 is a representation of a device receiving and processing a swipe from a user attempting to access a device according to an example embodiment.

FIG. 2 is a block diagram of the device 100 illustrating a user attempting to unlock device 100 by tracing the authentication path 130. The nodes 115-126 may or may not be displayed in various embodiments. If displayed, a user may use them to enter the path 130 in the same position on the touchscreen 110 as originally set up. If not displayed, the same path may be traced anywhere on the touchscreen 110.

As the user traces or swipes the path 130, the user may pause at the point that corresponds to a symbol dragged to that point during setup. When the users pauses at that point, node 119 in this example, a menu of symbols 210 is presented having at least one of the symbols from the setup set of symbols 135, in this case, the triangle 142. In further embodiments, the menu of symbols 210 may be presented when the user reaches a known point. The phrase, reaches a known point, may include approaching the known point, or being proximate or close to the point during a swipe, rather than pausing on the point. The other symbols 140 and 144 may be the same as those in the set 135, or may differ. In one embodiment, the order of the symbols appearing at 210 may be varied, such as by randomization to impair the ability to discover a pattern by looking at residual smudges from prior entry of the path and symbol selection.

After selecting the proper symbol 142, the user may complete tracing of the path and selecting again if more than one point has been associated with a symbol. A selection of the wrong symbol, or pausing at a wrong point on the path may invalidate the swipe. A number of consecutive invalid swipe attempts may lock the device from further attempts. Upon successful completion, the user may be granted access to the device 100. The amount of time for a pause may be varied by the user. One example pause time may be more than one half of a second, or longer. The pause time may be set by the user or defaulted to a value. Similarly, if the menu of symbols to select is based on proximity of the swipe position to a known point, the distance from the known point may be selected by the user. A typical distance may be within a centimeter, but may be varied as desired. As with the setup illustrated in FIG. 1, the nodes 115-126 may be visible, or not visible. Further, a trace line may appear while the user is performing the trace to aid in returning to the path following selection of a symbol.

In further embodiments, multiple symbols may be associated with a single node. The menu of symbols 210 may remain to allow the user to select at least one more symbol following selection of the first symbol. The user may also pause again on the same point, resulting in display of the menu of symbols 210 again, and selection of a further symbol which may be the same or different, and also may be varied each time the menu is displayed.

Figure 3:
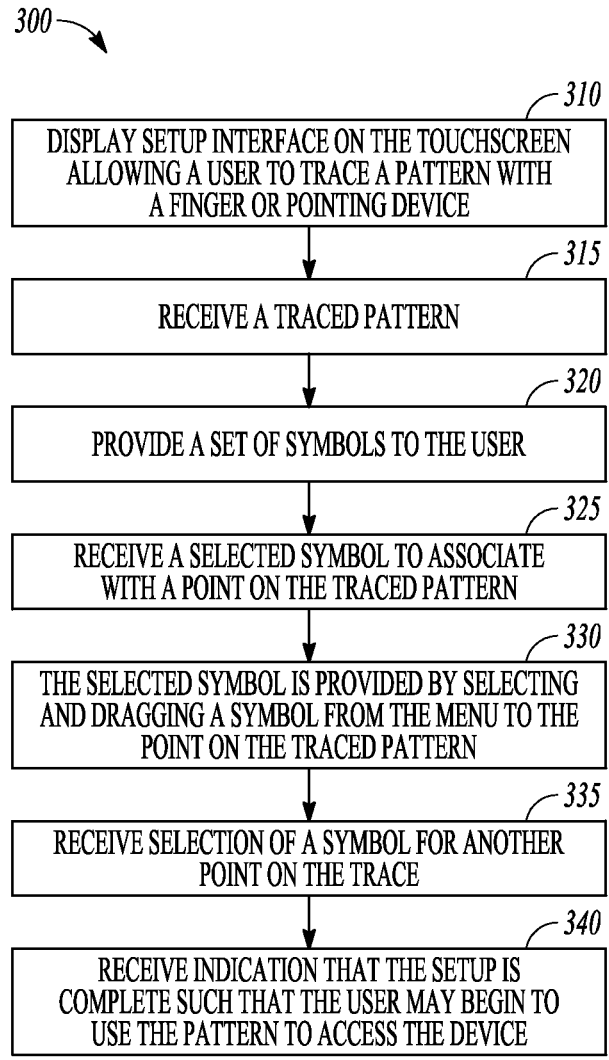
FIG. 3 is a flowchart illustration of a method of setting up an authentication pattern according to an example embodiment.

FIG. 3 is a flowchart illustrating a method 300 of creating a login gesture on a touchscreen of a device. The method 300 may include during a setup period, presenting a set of symbols available for association with the known point, and receiving a selection by the user from the set of symbols available, a symbol to associate with the known point. At 310, a setup interface is displayed on the touchscreen allowing a user to trace a pattern with a finger or pointing device. The traced pattern is received at 315. The user is also provided a set of symbols at 320. The user may select a symbol to associate with a point on the traced pattern at 325, such as by selecting and dragging a symbol from the menu to the point on the traced pattern at 330. The user may also select a symbol for another point on the trace if desired at 335. Once done setting up the pattern, including the trace and at least one symbol to select at a point on the trace, the user may indicate that the setup is complete at 340 and begin to use the pattern to access the device.

Figure 4:
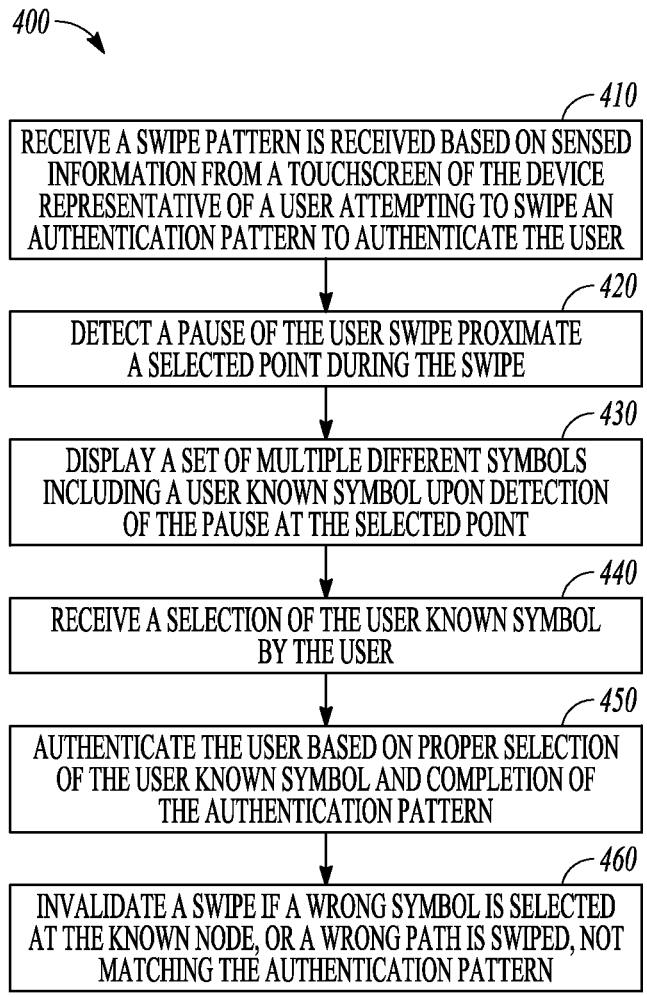
FIG. 4 is a flowchart illustration of a method of receiving and processing a swipe from a user attempting to access a device according to an example embodiment.

FIG. 4 is a flowchart illustrating a method 400 of using the setup pattern to authenticate a user and provide access to the user. Method 400 may begin by a user turning on the device, or otherwise trying to access the device. At 410, a swipe pattern is received based on sensed information from a touchscreen of the device representative of a user attempting to swipe an authentication pattern to authenticate the user. A pause of the user swipe may be detected at 420 proximate a selected point during the swipe. Alternatively, the user swipe may be detected as proximate the selected point. A set of multiple different symbols including a user known symbol is displayed at 430 upon detection of the proximity or pause at the selected point. At 440, a selection of the user known symbol by the user is received. The user is then authenticated at 450 based on proper selection of the user known symbol and completion of the authentication pattern.

In one embodiment, dots corresponding to nodes on the touchscreen are displayed corresponding to the authentication pattern. One of the dots corresponds to the known point. The set of multiple different symbols may be done with an ordered varied. The order may be a randomized order of the displayed symbols. The symbols may have different shape or color.

In still further embodiments, a second set of symbols may be provided when the user pauses at a further known point on the pattern, which may be the same point or a different point. The symbol associated with the further known point may also be the same symbol or a different symbol from the set of symbols. In one embodiment, method 400 includes invalidating a swipe at 460 if a wrong symbol is selected at the known node, or a wrong path is swiped, not matching the authentication pattern.

Figure 5:
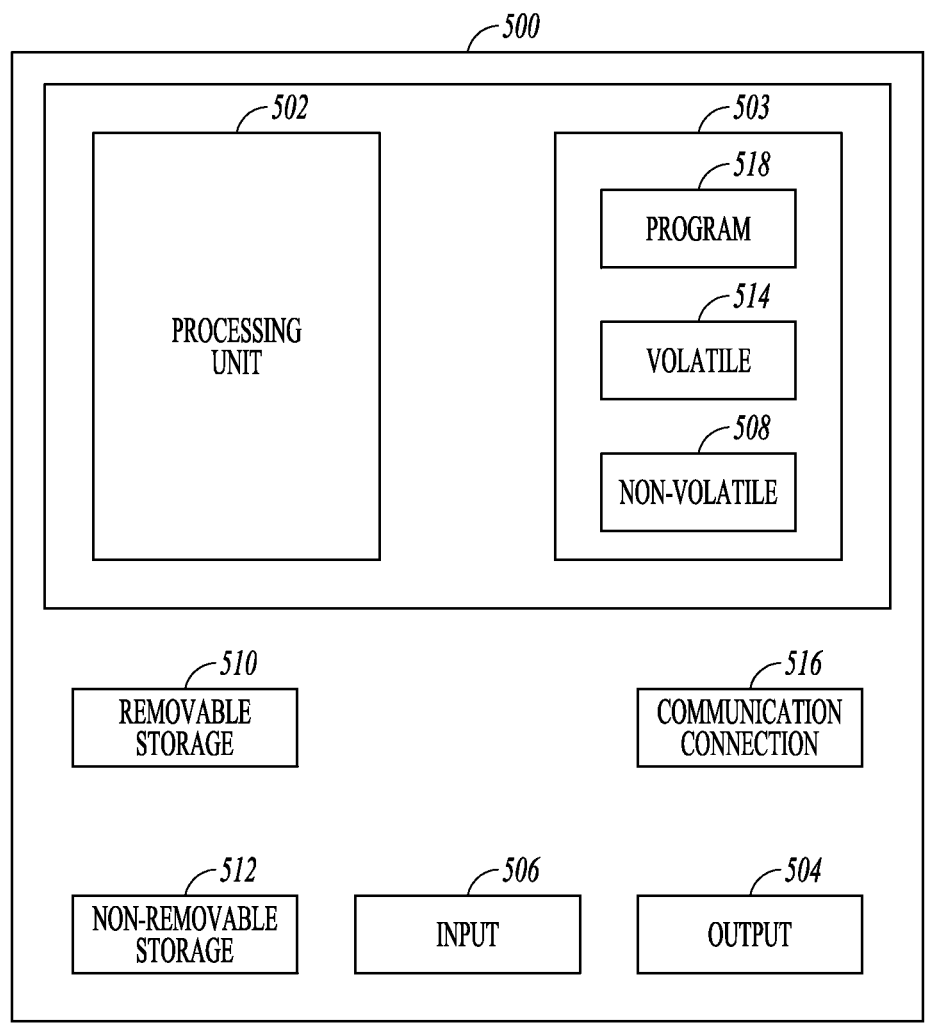
FIG. 5 is a block diagram of computer system used to implement methods according to an example embodiment.

FIG. 5 is a block schematic diagram of a computer system 500 to implement one or more methods according to example embodiments. All components need not be used in various embodiments. One example computing device in the form of a computer 500, may include a processing unit 502, memory 503, removable storage 510, and non-removable storage 512. Sensors 115 and 125 may be coupled to provide data to the processing unit 502. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. Output 504 may include a display device, such as a touchscreen, that also may serve as an input device. The computer may operate in a networked environment using a communication connection to connect to one or more remote computers, such as database servers or cellular networks. The remote computer may include a personal computer (PC), server, router, network PC, smart phone, touchpad, a peer device or other common network node, or the like. The communication connection may include a Local Area Network (LAN), a Wide Area Network (WAN), cellular network, or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A method comprising:
receiving swipe pattern sensed information from a touchscreen device representative of a user attempting to swipe an authentication pattern to authenticate the user;
displaying a set of multiple different symbols including a user known symbol when the swipe reaches a known point in the authentication pattern;
receiving a selection of the user known symbol; and
authenticating the user based on proper selection of the user known symbol and completion of the authentication pattern.

2. The method of example 1 and further comprising showing dots on the touchscreen corresponding to the authentication pattern, wherein one of the dots corresponds to the known point.

3. The method of any of examples 1-2 wherein displaying the set of multiple different symbols comprises randomizing a position of the displayed symbols.

4. The method of any of examples 1-3 wherein the symbols have different shape or color.

5. The method of any of examples 1-4 and further comprising displaying the set of symbols at a second known point.

6. The method of any of examples 1-5 and further comprising invalidating a swipe if a wrong symbol is selected at the known node.

7. The method of any of examples 1-6 and further comprising invalidating a swipe if the received swipe pattern does not match the authentication pattern.

8. The method of any of examples 1-7 and further comprising:
during a setup period, presenting a set of symbols available for association with the known point; and
receiving a selection by the user from the set of symbols available, a symbol to associate with the known point.

9. The method of example 8 and further comprising receiving a second selection by the user to associate with a second known point.

10. A machine readable storage device having instructions for execution by a processor of the machine to perform:
receiving swipe pattern sensed information from a touchscreen device representative of a user attempting to swipe an authentication pattern to authenticate the user;
displaying a set of multiple different symbols including a user known symbol when the swipe reaches a known point in the authentication pattern;
receiving a selection of the user known symbol; and
authenticating the user based on proper selection of the user known symbol and completion of the authentication pattern.

11. The machine readable storage device of example 10 wherein the instructions when executed by the processor further perform showing dots on the touchscreen corresponding to the authentication pattern, wherein one of the dots corresponds to the known point.

12. The machine readable storage device of any of examples 10-11 wherein displaying the set of multiple different symbols comprises randomizing a position of the displayed symbols.

13. The machine readable storage device of any of examples 10-12 wherein the instructions when executed by the processor further perform displaying the set of symbols at a second known point.

14. The machine readable storage device of any of examples 10-13 wherein the instructions when executed by the processor further perform invalidating a swipe if a wrong symbol is selected at the known node.

15. The machine readable storage device of any of examples 10-14 wherein the instructions when executed by the processor further perform:
during a setup period, presenting a set of symbols available for association with the known point; and
receiving a selection by the user from the set of symbols available, a symbol to associate with the known point.

16. The machine readable storage device of any of examples 10-15 wherein the instructions when executed by the processor further perform receiving a second selection by the user to associate with a second known point.

17. A device comprising:
a processor; and
a memory device having a program stored thereon for execution by the processor to:
receive swipe pattern sensed information from a touchscreen device representative of a user attempting to swipe an authentication pattern to authenticate the user;
display a set of multiple different symbols including a user known symbol when the swipe reaches a known point in the authentication pattern;
receive a selection of the user known symbol; and
authenticate the user based on proper selection of the user known symbol and completion of the authentication pattern.

18. The device of example 17 wherein the processor further shows dots on the touchscreen corresponding to the authentication pattern, wherein one of the dots corresponds to the known point.

19. The device of any of examples 17-18 wherein the display of the set of multiple different symbols comprises randomizing a position of the displayed symbols.

20. The device of any of examples 17-19 wherein the processor further invalidates a swipe if a wrong symbol is selected at the known node.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving swipe pattern sensed information from a touchscreen device representative of a user attempting to swipe an authentication pattern to authenticate the user;
displaying a set of multiple different symbols including a user known symbol responsive to the swipe reaching a first known point in the authentication prior to an end of the authentication pattern;
receiving a selection of the user known symbol; and
authenticating the user based on proper selection of the user known symbol and completion of the authentication pattern, wherein completion of the of the authentication pattern follows selection of the user known symbol.

2. The method of claim 1 wherein displaying the set of multiple different symbols comprises randomizing a position of the displayed symbols, wherein the user known symbol is known only to the user.

3. The method of claim 2 wherein the symbols have different shape or color and appear responsive to the swipe pattern sensed information representing a user pausing a predetermined amount of time proximate the first known point.

4. The method of claim 1 and further comprising displaying the set of symbols at a second known point in the authentication pattern, and wherein authenticating the user includes receiving a proper selection a second user known symbol at the second point.

5. The method of claim 1 and further comprising invalidating a swipe responsive to a wrong symbol being selected at the first known point.

6. The method of claim 1 and further comprising invalidating a swipe responsive to the received swipe pattern not matching the authentication pattern.

7. The method of claim 1 and further comprising showing dots on the touchscreen corresponding to the authentication pattern, wherein one of the dots corresponds to the first known point.

8. The method of claim 1 and further comprising:
during a setup period, presenting a set of symbols available for association with the first known point; and
receiving a selection by the user from the set of symbols available, a symbol to associate with the first known point.

9. The method of claim 8 and further comprising receiving a second selection by the user to associate with a second point in the authentication pattern.

10. A machine readable storage device having instructions for execution by a processor of the machine to perform:
receiving swipe pattern sensed information from a touchscreen device representative of a user attempting to swipe an authentication pattern to authenticate the user;
displaying a set of multiple different symbols including a user known symbol when the swipe reaches a first known point in the authentication pattern prior to an end of the authentication pattern;
receiving a selection of the user known symbol; and
authenticating the user based on proper selection of the user known symbol and completion of the authentication pattern, wherein completion of the of the authentication pattern follows receiving selection of the user known symbol.

11. The machine readable storage device of claim 10 wherein displaying the set of multiple different symbols comprises randomizing a position of the known symbol within the displayed symbols.

12. The machine readable storage device of claim 10 wherein the instructions when executed by the processor further perform displaying the set of symbols at a second known point in the authentication pattern.

13. The machine readable storage device of claim 10 wherein the instructions when executed by the processor further perform invalidating a swipe responsive to a wrong symbol being selected at the first known point.

14. The machine readable storage device of claim 10 wherein the instructions when executed by the processor further perform showing dots on the touchscreen corresponding to the authentication pattern, wherein one of the dots corresponds to the first known point.

15. The machine readable storage device of claim 10 wherein the instructions when executed by the processor further perform:
during a setup period, presenting a set of symbols available for association with the first known point; and
receiving a selection by the user from the set of symbols available, a symbol to associate with the first known point.

16. The machine readable storage device of claim 10 wherein the instructions when executed by the processor further perform receiving a second selection by the user to associate with a second known point in the authentication pattern.

17. A device comprising:
a processor; and
a memory device having a program stored thereon for execution by the processor to:
receive swipe pattern sensed information from a touchscreen device representative of a user attempting to swipe an authentication pattern to authenticate the user;
display a set of multiple different symbols including a user known symbol when the swipe reaches a first known point in the authentication pattern prior to an end of the authentication pattern;
receive a selection of the user known symbol; and
authenticate the user based on proper selection of the user known symbol and completion of the authentication pattern, wherein completion of the of the authentication pattern follows selection of the user known symbol.

18. The device of claim 17 wherein the display of the set of multiple different symbols comprises randomizing a position of the known symbol within the displayed symbols.

19. The device of claim 17 wherein the processor further shows dots on the touchscreen corresponding to the authentication pattern, wherein one of the dots corresponds to the first known point.

20. The device of claim 17 wherein the processor further invalidates a swipe responsive to a wrong symbol being selected at the first known point.

* * * * *